Dec. 27, 1966  W. STANKE  3,293,776
CONVEYOR

Filed July 29, 1964  3 Sheets-Sheet 1

INVENTOR:
Walter Stanke

BY
Michael J. Striker
his ATTORNEY.

Dec. 27, 1966 W. STANKE 3,293,776
CONVEYOR
Filed July 29, 1964 3 Sheets-Sheet 2

INVENTOR:
Walter Stanke
BY
Michael J. Strikor
his ATTORNEY.

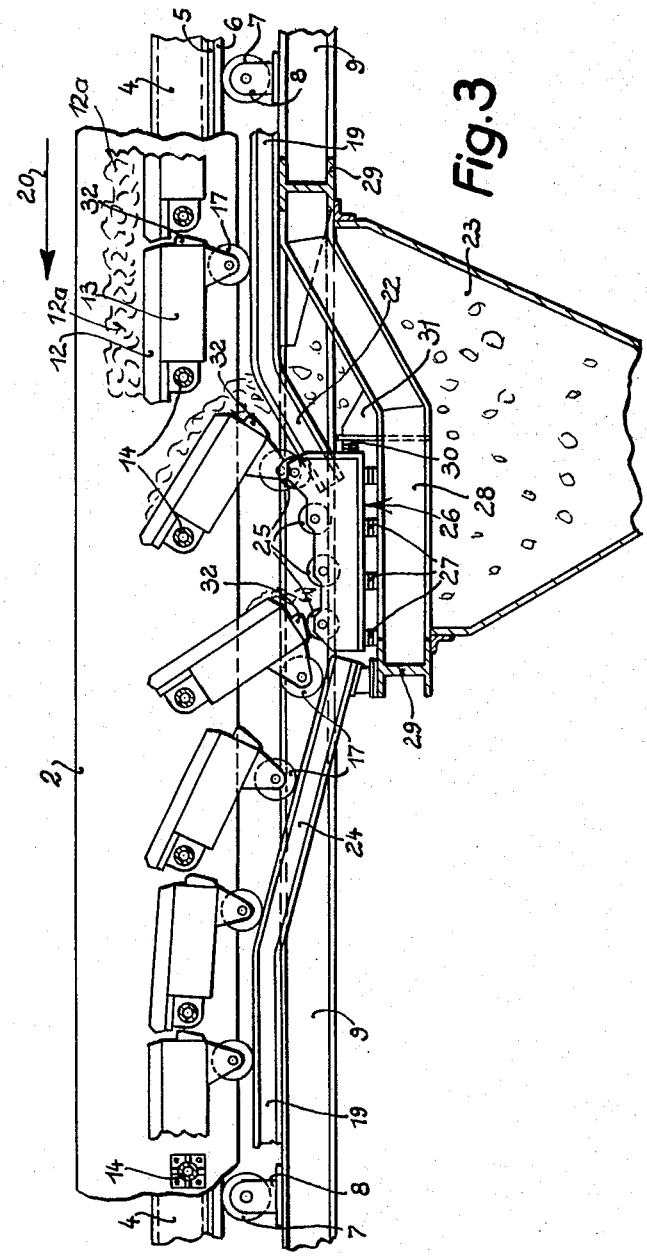

United States Patent Office 3,293,776
Patented Dec. 27, 1966

3,293,776
CONVEYOR
Walter Stanke, Essen, Germany, assignor to Heinrich
Koppers G.m.b.H., Essen, Germany
Filed July 29, 1964, Ser. No. 385,983
Claims priority, application Germany, July 31, 1963,
K 50,392
5 Claims. (Cl. 34—194)

The present invention relates to conveyors in general, and more particularly to endless apron conveyors of the type wherein the aprons receive loads of pulverulent, granular or other particulate material and transport the material to an unloading or dumping station. Such conveyors may be provided with apertured aprons so as to be useful for cooling of hot cinder, slag and similar particulate materials.

A serious drawback of presently known conveyors which are used for cooling of hot particulate material is that the particles of such material tend to clog the apertures of the aprons so that little, if any, air can flow through the loads which are conveyed by the aprons and the conveyor must be arrested at frequent intervals to allow for cleaning of its aprons. It was found that a gentle vibrating action is rather ineffective, particularly if the aprons are used for transporting substantial loads of broken-up slag or the like, because the particles are wedged between the grates of the aprons and can be removed solely by exertion of substantial forces.

Accordingly, it is an important object of my invention to provide a novel method of separating particles of granular or pulverulent material from the aprons of an endless conveyor in such a way that any particles which tend to adhere to the aprons are separated and dumped in a fully automatic way.

Another object of the invention is to provide a novel endless conveyor which may be utilized for practicing the above outlined method and which may be readily converted for treatment of different types and sizes of particulate material.

A further object of the invention is to provide an endless apron conveyor wherein the device which separates the particles of conveyed material from the aprons occupies very little space and wherein such device occupies space which is normally available in apron conveyors so that many conventional conveyors may be converted for practicing the method of my invention whereby such conversion requires minimal alterations in the construction, mounting and operation of other component parts.

An additional object of the invention is to provide a novel shaking or separating device which may be utilized in an apron conveyor to insure complete, rapid and fully automatic separation of all such particles which tend to adhere to grates, perforated plates and similar types of material transporting aprons.

A concomitant object of my invention is to provide a novel conveyor for cooling of broken-up slag, cinder or similar particulate material and to construct the conveyor in such a way that its apertured material transporting members are cleaned in a fully automatic way while the conveyor is in actual use so that the conveyor may be operated without interruptions and its material transporting members will allow large quantities of air to flow uniformly through and to rapidly cool the loads of conveyed material.

With the above objects in view, one feature of the present invention resides in the provision of a method of treating granular, pulverulent and similar particulate material which is transported by a conveyor including a series of tiltable aprons advancing along an endless path from a loading station through an unloading station and back to the loading station. The method comprises feeding loads of particulate material onto the aprons which advance successively through the loading station, tilting the thus loaded aprons seriatim while the aprons advance through the unloading station whereby the aprons dump their loads, returning the aprons seriatim to their normal untilted positions before such aprons return to the loading station, and shaking the aprons seriatim while the aprons advance through the unloading station so as to jar loose any particles of conveyed material which tend to adhere to the aprons.

The aprons normally resemble grates so that the material may be cooled by currents of air which is preferably sucked through the aprons, and the aprons are shaken by being caused to rebound on impact against one or more protuberances which are provided at the unloading station.

The novel features which are considered as characteristic of the invention are set forth in particular in the appended claims. The improved conveyor itself, however, both as to its construction and its mode of operation, together with additional features and advantages thereof, will be best understood upon perusal of the following detailed description of a specific embodiment with reference to the accompanying drawings, in which:

FIG. 3 is a vertical section through the unloading station substantially as seen in the direction of arrows from the line III—III of FIG. 1.

Figure 1:
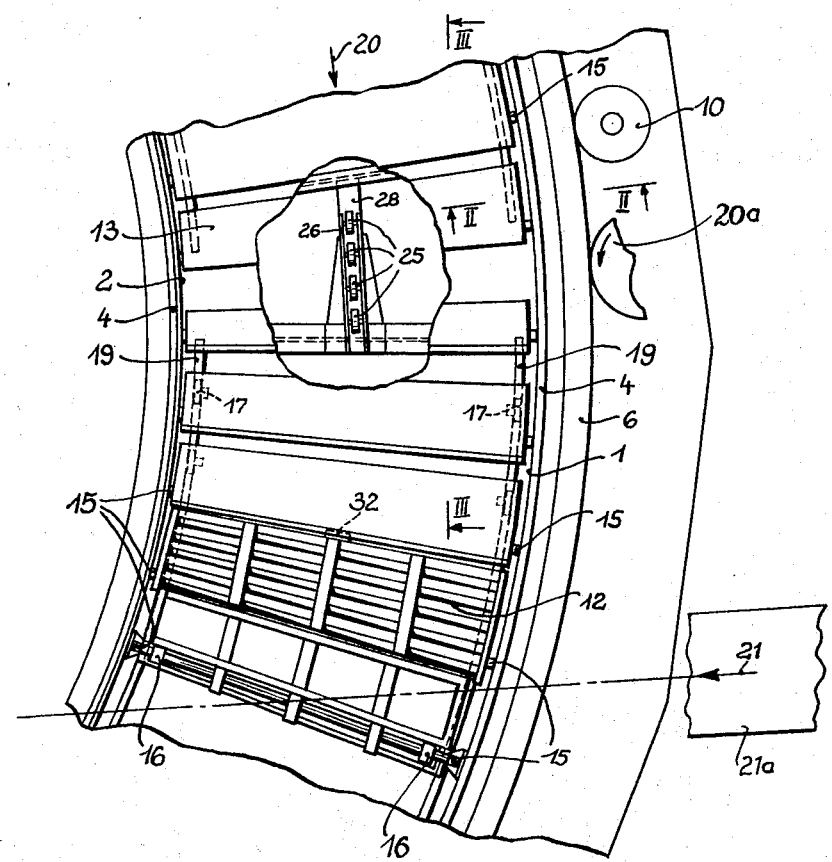
FIG. 1 is a fragmentary top plan view of the loading station in a circular apron conveyor which embodies the invention.
Figure 2:
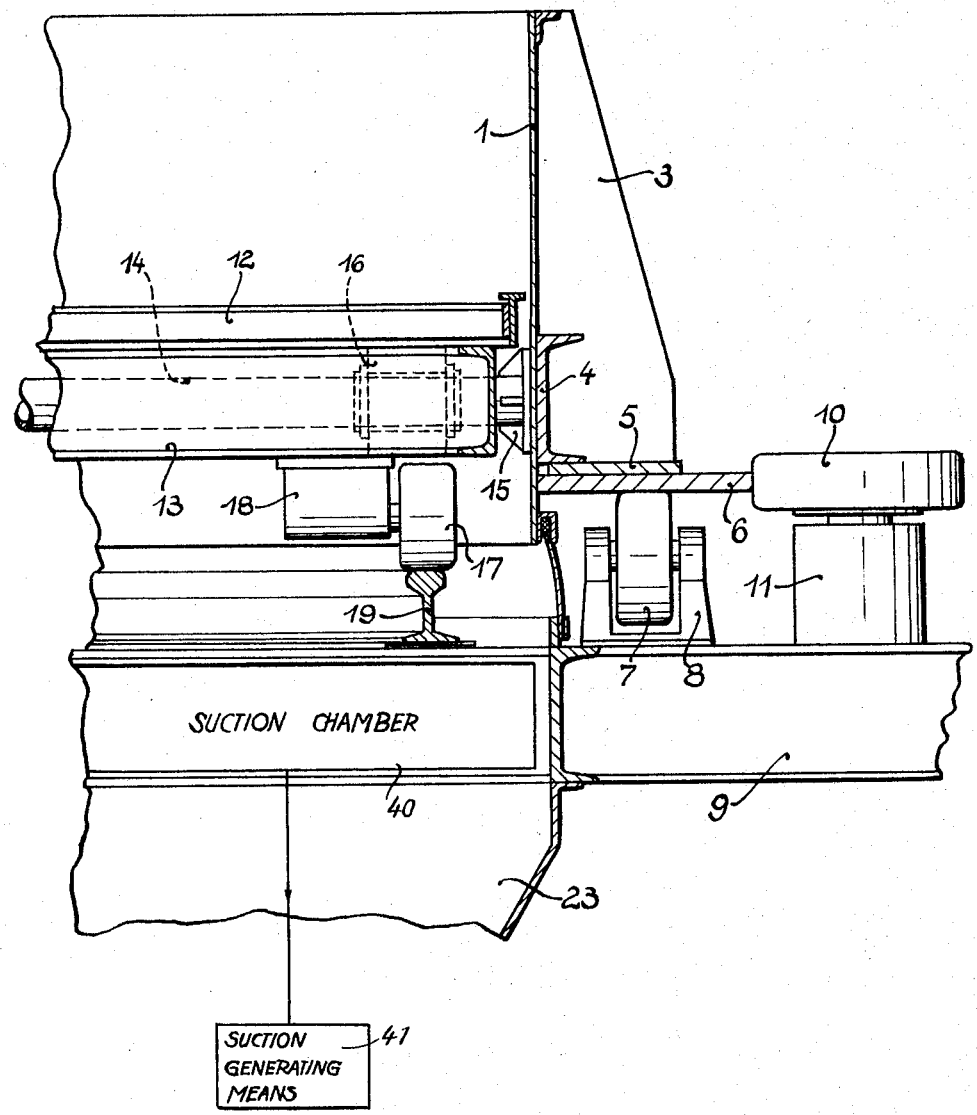
FIG. 2 is an enlarged fragmentary radial section as seen in the direction of arrows from the line II—II of FIG. 1.

Referring to FIGS. 1 and 2, the conveyor comprises an outer vertical cylindrical wall 1 and an inner vertical cylindrical wall 2 which is concentric with the outer wall so that the two walls define between themselves an annular space which accommodates a series of tiltable grate-like material transporting members in the form of aprons 12. Each wall is connected with a series of radially extending equidistant stiffening plates 3 whereby the outer plates extend outwardly from the wall 1 (see FIG. 2) and the inner plates extend inwardly from the wall 2. The lower portions of the walls 1, 2 are connected with the webs of U-shaped stiffeners 4 which form two complete annuli and cooperate with the plates 3 to pervent deformation of the walls. The lower flanges of the stiffeners 4 are fixed to ring-shaped upper supports 5 which in turn are fixed to similar ring-shaped lower supports 6. The supports 5, 6 are disposed in horizontal planes and their upper sides are welded to the stiffening plates 3. The heretofore described structure constitutes a stiff twin-walled annular shell of the conveyor and is rotatable about its vertical axis. This shell is supported by a series of circularly arranged friction-reducing rolls 7 which are rotatable in inverted U-shaped bearings 8 whose webs are secured to a stationary base structure 9. The peripheral surface of the ring-shaped support 6 is engaged by a series of suitably spaced centering rolls 10 which are mounted in bearings 11 supported by the base 9. It will be noted that the rolls 7 and 10 respectively rotate about horizontal and vertical axes. One or more rolls 10 may be driven to rotate the walls 1, 2 in a counterclockwise direction, as viewed in FIG. 1 (see the arrow 20). Alternatively, the periphery of the outer support 6 may be engaged by one or more friction wheels 20a (one shown in FIG. 1) which are driven by a suitable motor through a transmission or the like, not shown.

The aprons 12 resemble sector-shaped panels, troughs or plates and are formed with slots, interstices, bores or other types of apertures to allow for rapid cooling of conveyed material 12a (see FIG. 3). Each apron 12 carries at its underside a box-shaped under-structure or truck 13 which is traversed by a horizontal pivot 14 extending in the radial direction of and having end portions rotatably supported by the walls 1, 2. Each pivot may resemble a solid shaft or a tube and its end portions are rotatable in bearings 15 which are supported by the walls 1 and 2. Each pivot 14 further extends through suitable bearings 16 which are provided in the respective truck 13 so that the aprons 12 are free to rock about the horizontal axes of their pivots while advancing through the unloading station of FIG. 3. It goes without saying that the aprons 12 may be rocked together with or with reference to the respective pivots 14.

Each truck 13 carries at its underside two bearings 18 for a pair of coaxial wheels 17 which travel on suitable ways here shown as guide rails 19 supported by the base 9. The common axis of each pair of wheels 17 extends substantially radially of the walls 1, 2 and the wheels are located rearwardly of the respective pivots 14, as seen in the direction of arrow 20. It is clear that the wheels 17 may be replaced by sliders or other types of followers as long as they can track the guide rails 19 in order to keep the aprons 12 in substantially horizontal planes excepting, of course, while the aprons advance through the unloading station of FIG. 3. It is also possible to provide each truck 13 with a single wheel 17 and to omit one of the rails 19.

When the friction wheel 20a drives the walls 1, 2 at a speed which is sufficiently low to permit for satisfactory cooling of the material 12a while the aprons 12 advance along an endless horizontal circular path from the loading station of FIG. 1 to the unloading or tilting station of FIG. 3, the aprons form an endless series of material transporting members and define a substantially continuous circular platform or band for conveyed material. This band is interrupted only while the aprons 12 dump their loads at the unloading station, i.e., while the trailing portion (wheels 17) of each consecutive apron moves from a normal raised position to a lower position. The means for feeding hot particulate material 12a onto consecutive aprons 12 comprises an endless conveyor belt 21a whose upper stringer advances in the direction indicated in FIG. 1 by the arrow 21. The belt 21a may but need not advance the material in the radial direction of the walls 1, 2. While the material travels in the annular space between the walls 1 and 2, it is cooled by currents of air which are drawn through the aprons 12 and trucks 13 by one or more suction chambers 40 which are located at a level below the trucks and are connected to one or more suctions fans 41 or other types of suction generating means. FIG. 2 shows that the sides of the shell including the walls 1, 2 are sealed to insure that air cannot leak around the aprons 12 whereby the material 12a may be cooled within short periods of time. FIG. 2 also shows that the median portions of the trucks 13 are apertured so that air passing through the material 12a and through the apertures of the aprons 12 may enter the suction chamber 40.

The unloading station of FIG. 3 accommodates a take-off conveyor here shown as a collecting receptacle in the form of a funnel 23 which is disposed between the walls 1, 2 at a level below the guide rails 19 and has an open top so as to receive cooled particulate material 12a which is dumped by consecutive aprons 12. Each rail 19 comprises a pair of spaced inclined portions 22, 24 which are respectively located upstream and downstream of the funnel 23 so that each wheel 17 is caused to descend by gravity (see the downwardly inclined portions 22) whereby the corresponding apron is rocked and dumps its load through the open top of the funnel 23. During tilting, the aprons 12 rock about the pivots 14 and remain in inclined positions while advancing across the gap between the inclined portions 22 and 24. Once they reach the upwardly inclined portions 24, the wheels 17 begins to move upwardly until the corresponding aprons return into substantially horizontal planes and thereupon advance toward and through the loading station of FIG. 1 to receive a new load of hot particulate material 12a. The portions 22 constitute a tilting or dumping device and the portions 24 constitute a lifting or realigning device for the aprons 12.

In accordance with the present invention, the gap between the lower ends of the inclined portions 22, 24 accommodates a shaking or jarring device which causes the trailing portions of the aprons 12 to rebound once or more than once whereby any remnants of particulate material 12a are shaken loose and descend into the funnel 23. This is important because such particles could clog the apertures in the aprons 12 and/or trucks 13 and would prevent proper cooling of the bulk of conveyed material by currents of air which are drawn by the suction chamber 40. The shaking device comprises a series of shaking rollers 25 which are journalled in a block-shaped carrier 26 so as to be rotatable about horizontal axes which are substantially parallel to the axes of the wheels 17. The carrier 26 rests on a series of elastically deformable shock absorbing cushions 27 supported by the upper side of a subframe including longitudinal beams 28 and transverse beams 29. The beams 28, 29 are supported by the base 9. The rear end face of the carrier 26 is provided with one or more additional elastic shock absorbing cushions 30 which abut against an upwardly extending bracket or stop 31 of the subframe 28, 29. The cushions 27, 30 allow the carrier 26 to move within limits in a horizontal or vertical direction whenever the rollers 25 are engaged by the aprons 12. Actually, the rollers 25 are engaged by suitable motion transmitting projections 32 provided centrally at the trailing ends of the aprons 12 and, as shown in FIG. 3, the projections 32 of lowered trailing portions will rebound from roller to roller to thereby shake the corresponding apron and to insure that all remnants of cooled material 12a descend into the funnel 23 which conveys such material to a further processing station, not shown. It will be noted that the rollers 25 are located midway between pairs of inclined portions 22, 24 of the guide rails 19.

It goes without saying that the carrier 26 may support one, two, three, five or even more shaking rollers 25, depending on the nature of conveyed material, on the speed at which the walls 1, 2 rotate, on the dimensions of apertures in the aprons 12 and trucks 13, and on certain other factors. Also, the rollers 25 may be omitted and the upper side of the carrier 25 is then provided with one or more fixed protuberances which extend into the path of the projections 32 to bring about a shaking or jarring action. Similar protuberances may be provided on the inclined portions 22, 24.

If the operator finds that four shaking rollers 25 are too many, i.e., that one, two or three such rollers will suffice to insure complete and fully automatic cleaning of the aprons, he will normally remove one or more rollers to reduce the wear on the aprons and on the shaking device. Thus, the operator is in a position to regulate the self-cleaning action of the conveyor. Similar effects can be produced by utilizing exchangeable projections 32 with more or less pronounced elastic characteristics so that the extent to which the trailing portion of an apron will rebound depends on the elasticity of the corresponding projection.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A conveyor, particularly for cooling granular, pulverulent and similar particulate material, comprising an endless series of material transporting members each having a leading portion rockable about a horizontal axis which is substantially perpendicular to the direction of movement and a trailing portion movable between a normal raised position and a lower position; drive means for advancing said members along an endless path; feeding means for delivering loads of particulate material onto consecutive members while said members advance along a first portion of said path; tilting means located past said feeding means for rocking said members consecutively about the respective axes so that the trailing portions descend to said lower positions and the respective members dump their loads; lifting means provided intermediate said tilting means and said feeding means for returning said trailing portions to said normal positions; and a shaking device extending into the pathway of lowered trailing portions to jar the corresponding members and to shake loose any such particles of conveyed material which tend to adhere to said members, said shaking device comprising a carrier disposed intermediate said tilting means and said lifting means and at least one protuberance provided on said carrier and positioned in the pathway of said trailing portions in the lower positions thereof.

2. A conveyor, particularly for cooling granular, pulverulent and similar particulate material, comprising an endless series of material transporting members each having a leading portion rockable about a horizontal axis which is substantially perpendicular to the direction of movement and a trailing portion movable between a normal raised position and a lower position; drive means for advancing said members along an endless path; feeding means for delivering loads of particulate material onto consecutive members while said members advance along a first portion of said path; tilting means located past said feeding means for rocking said members consecutively about the respective axes so that the trailing portions descend to said lower positions and the respective members dump their loads; lifting means provided intermediate said tilting means and said feeding means for returning said trailing portions to said normal positions; and a shaking device extending into the pathway of lowered trailing portions to jar the corresponding members and to shake loose any such particles of conveyed material which tend to adhere to said members, said shaking device comprising a fixed subframe located intermediate said tilting means and said lifting means, a carrier provided on said subframe, elastically deformable cushioning means interposed between said carrier and said subframe, and at least one protuberance extending upwardly from said carrier and into the pathway of said trailing portions in the lower positions thereof.

3. A conveyor as set forth in claim 2, wherein said shaking device further comprises stop means secured to and extending upwardly from said subframe at one end of said carrier, and additional elastic cushioning means provided between said carrier and said stop means.

4. A conveyor as set forth in claim 3, wherein said stop means is adjacent to the rear end of said carrier, as seen in the direction of movement of said material transporting members.

5. A conveyor, particularly for cooling granular, pulverulent and similar particulate material, comprising an endless series of grate-like apertured material transporting members each having a leading portion rockable about a horizontal axis which is substantially perpendicular to the direction of movement and a trailing portion movable between a normal raised position and a lower position; drive means for advancing said members along an endless path; feeding means for delivering loads of particulate material onto consecutive members while said members advance along a first portion of said path; tilting means located past said feeding means for rocking said members consecutively about the respective axes so that the trailing portions descend to said lower positions and the respective members dump their loads; a take-off device located beneath said path and arranged to receive material which is dumped by consecutive material transporting members; lifting means provided intermediate said take-off device and said feeding means for returning said trailing portions to said normal positions; and a shaking device extending into the pathway of lowered trailing portions at a level above said take-off device to jar the corresponding members and to shake loose any such particles of conveyed material which tend to accumulate in the apertures of and otherwise tend to adhere to said members, said shaking device including a resiliently supported carried and at least one shaking roller mounted on said carrier to rotate about a horizontal axis which is substantially parallel to the axes of such material transporting members whose trailing portions engage said shaking roller in the lower positions thereof.

References Cited by the Examiner

UNITED STATES PATENTS

| | | | |
|---|---|---|---|
| 1,797,931 | 3/1931 | Storer | 266—21 |
| 1,848,639 | 3/1932 | Maurel | 198—145 X |
| 2,654,490 | 10/1953 | Glaze | 214—64.2 |
| 2,892,265 | 6/1959 | Zimmermann et al | 34—194 X |
| 3,055,486 | 9/1962 | Meyer | 198—145 |

FREDERICK L. MATTESON, JR., *Primary Examiner.*

C. R. REMKE, *Assistant Examiner.*